United States Patent
Xiong et al.

(10) Patent No.: US 10,635,075 B2
(45) Date of Patent: Apr. 28, 2020

(54) METHOD FOR CONTROLLING ZERO-RETURN OF SERVO OF ROBOT, AND SERVO AND ROBOT WITH ENHANCED ZERO-RETURN

(71) Applicant: UBTECH Robotics Corp, Shenzhen (CN)

(72) Inventors: Youjun Xiong, Shenzhen (CN); Malin Wang, Shenzhen (CN); Wenhua Fan, Shenzhen (CN); Sheng Zhou, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/147,591

(22) Filed: Sep. 29, 2018

(65) Prior Publication Data
US 2019/0163159 A1   May 30, 2019

(30) Foreign Application Priority Data
Nov. 30, 2017   (CN) .......................... 2017 1 1240908

(51) Int. Cl.
| G05B 19/10 | (2006.01) |
| G05B 19/29 | (2006.01) |
| B25J 9/16 | (2006.01) |
| G05B 19/414 | (2006.01) |
| G05B 19/19 | (2006.01) |

(52) U.S. Cl.
CPC .......... *G05B 19/298* (2013.01); *B25J 9/1664* (2013.01); *G05B 19/19* (2013.01); *G05B 19/414* (2013.01); *G05B 2219/37104* (2013.01)

(58) Field of Classification Search
CPC ....... H02P 8/08; G05B 19/298; G05B 19/414; G05B 19/232
See application file for complete search history.

(56) References Cited

U.S. PATENT DOCUMENTS

2009/0190452 A1*   7/2009   Ho ..................... G11B 7/08582
                                                                 369/47.36

\* cited by examiner

*Primary Examiner* — Karen Masih (57) ABSTRACT

The present disclosure relates to a method for controlling zero-return of a servo of a robot, and a servo and a robot with enhanced zero-return. The method includes: outputting an activation command to a motor, and reading a default zero-point of the motor (w1) and a default zero-point of an output shaft of the speed reducer (w2). The output shaft of the motor (w1) is driven to return until the default zero-point of the output shaft of the speed reducer (w2) is the same with the current position of the output shaft of the speed reducer (w4) in response to the default zero-point of an output shaft of the speed reducer (w2) being not the same with the current position of the output shaft of the speed reducer (w4).

18 Claims, 5 Drawing Sheets

Outputting a pulse width modulation (PWM) command to the motor — S501 receiving the PWM command by the motor to drive the output shaft of the speed reducer to return — S502

METHOD FOR CONTROLLING ZERO-RETURN OF SERVO OF ROBOT, AND SERVO AND ROBOT WITH ENHANCED ZERO-RETURN

CROSS REFERENCE TO RELATED APPLICATIONS

This application claims priority to Chinese Patent Application No. 201711240908.X. filed Nov. 30, 2017, which is hereby incorporated by reference herein as if set forth in its entirety.

BACKGROUND

1. Technical Field

The present disclosure relates to automatic control technology, and particularly to a method for controlling zero-return of a servo of a robot, and a servo and a robot with enhanced zero-return.

2. Description of Related Art

The servo is a position (angle) servo drive for control systems that require constant angle changes and can be maintained. The servo is widely used in various joint movements of robots.

Both single-turn encoders and multi-turn encoders are absolute encoders that sense the current absolute angular position at any time, especially at the power-on moment. The single-turn encoder can only sense the absolute angular position within one revolution. The multi-turn encoder can not only sense the absolute angular position within one revolution, but also the number of turns that the encoder turns.

Conventionally, a single-turn encoder is arranged at the motor output end of the servo for measuring the rotational speed of the motor output shaft and the real-time position of the motor rotor, etc. However, there are circumstances in which no brake device is provided in the steering system. Due to gravity, the arms may swing out of the original position when a stop command is received. Since the angle of the steering wheel of the servo will exceed 360 degrees when the arm is swung at a certain angle, when the servo is started again, if the motor output is provided with a single-turn encoder, the precise zero-return of the servo rotor cannot be achieved. However, if the multi-turn encoder is used to achieve accurate zero-return of the servo rotor, the cost will be high.

Therefore, the conventional technical solution cannot realize precise zero-return of the servo rotor.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

Figure 1:
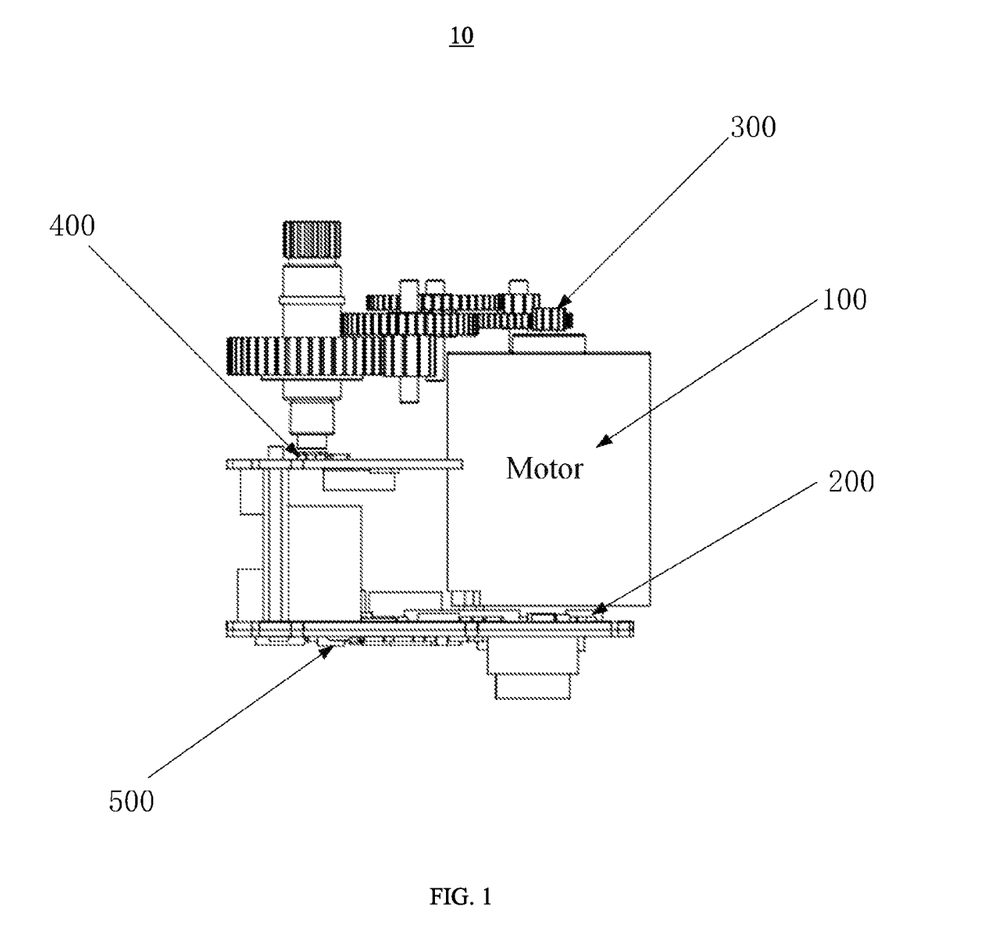
FIG. 1 is a schematic view of the servo with enhanced zero-return in accordance with one embodiment of the present disclosure.

FIG. 1 is a schematic view of the servo with enhanced zero-return in accordance with one embodiment of the present disclosure.

The servo 10 is a rotary actuator or linear actuator that allows for precise control of angular or linear position, velocity and acceleration. The servo 10 may be used for movement of hands and/or feet and other components of a robot. In the embodiment, a rotor of the servo 10 refers to an output shaft of the servo.

In one embodiment, the servo 10 includes a motor 100, a speed reducer 200 electrically connected to an output shaft of the motor 100, a first encoder 300 electrically connected to the output shaft of the motor 100, a second encoder 400 electrically connected to the output shaft of the speed reducer 200, and motor controller 500.

The motor 100 is configured to receive the activation command such that the output shaft of the motor 100 returns to the zero-point. The speed reducer 200 is configured to drive the motor 100 to transit from a high-speed output to the low-speed output. The first encoder 300 is configured to detect a current position of the output shaft of the motor 100. The second encoder 400 is configured to detect a current position of the output shaft of the speed reducer 200.

The motor controller 500 includes one or more processors and a storage (not shown). The processor may be a central processing unit (CPU), an universal processor, a digital signal processor (DSP), an application specific integrated circuit (ASIC), a field-programmable gate array (FPGA), a programmable logic device, a discrete gate or transistor logic, or a discrete hardware component. The universal processor may be a microprocessor or a conventional processor. The processor is configured to execute computerized code.

In one example, the storage may be an internal storage unit of the or an external storage unit, such as a hot-plug HDD, a smart media card (SMC), a secure digital (SD) card, and a flash card. The storage is configured to storage computer programs (computerized codes), data, and other applications.

The motor controller 500 is configured to output the activation command, to read the default zero-point of the output shaft of the motor 100 (w1) and the default zero-point of an output shall of the speed reducer 200 (w2), to compare the default zero-point of an output shaft of the speed reducer 200 (w2) with die current position of the output shaft of the speed reducer 200 (w4), to drive the output shaft of the motor 100 to return until the default zero-point of an output shaft of the speed reducer 200 (w2) is the same with the current position of the output shaft of the speed reducer 200 (w4), and to drive the output shaft of the motor 100 to return until the default zero-point of the output shaft of the motor 100 (w1) is the same with the current position of the output shaft of the motor 100 (w3).

In an embodiment, the present disclosure provides a robot including the servo 10 having the motor 100, the speed reducer 200, the first encoder 300, the second encoder 400, and the motor controller 500 as disclosed in the above.

Figure 2:
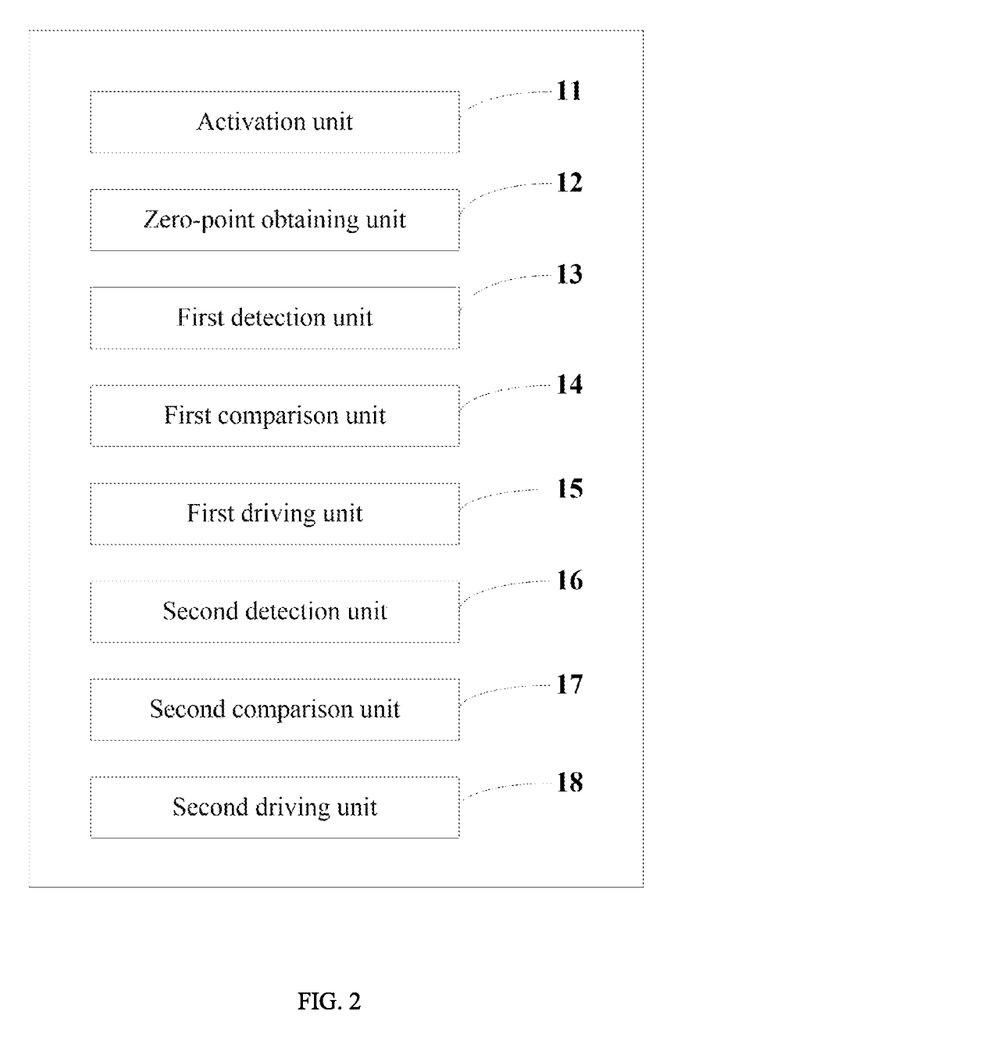
FIG. 2 is a schematic view showing a system for controlling zero-return of the servo of a robot in accordance with one embodiment of the present disclosure.

FIG. 2 is a schematic view showing the system for controlling the zero-return of the servo ("system") in accordance with one embodiment of the present disclosure. The system includes an activation unit 11, a zero-point obtaining unit 12, a first detection unit 13, a first comparison unit 14, a first driving unit 15, and a second detection unit 16, a second comparison unit 17, and a second driving unit 18.

The activation unit 11 is configured to issue an activation command to the motor 100, wherein the activation command includes a zero-return command. The zero-point obtaining unit 12 is configured to obtain the default zero-point of the output shaft of the motor 100 (w1) and the default zero-point of an output shaft of the speed reducer 200 (w2). The first detection unit 13 is configured to detect the current position of the output shaft of the speed reducer 200 (w4) by the second encoder 400. The first comparison unit 14 is configured to compare the default zero-point of an output shaft of the speed reducer 200 (w2) with the current position of the output shaft of the speed reducer 200 (w4). The first driving unit 15 is configured to drive the output shaft of the motor 100 to return until the default zero-point of an output shaft of the speed reducer 200 (w2) is the same with the current position of the output shaft of the speed reducer 200 (w4). The second detection unit 16 is configured to detect the current position of the output shaft of the motor 100 (w3) by the first encoder 300. The second comparison unit 17 is configured to compare the default zero-point of the output shaft of the motor 100 (w1) with the current position of the output shaft of the motor 100 (w3). Upon determining the default zero-point of the output shaft of the motor 100 (w1) is not the same with the current position of the output shaft of the motor 100 (w3), the second driving unit 18 is configured to drive the output shaft of the motor 100 to return until the default zero-point of the output shaft of the motor 100 (w1) is the same with the current position of the output shaft of the motor 100 (w3).

In an example, the first driving unit 15 further includes a command issuing unit configured to issue a PWM command to the motor, and a first driving unit configured to receive the PWM command to drive the motor such that the output shaft of the speed reducer to return until the default zero-point of an output shaft of the speed reducer 200 (w2) is the same with the current position of the output shaft of the speed reducer 200 (w4).

In an example, the second driving unit 18 further includes a deviation calculation unit to calculate the deviation ($\varepsilon$) between the current position of the output shaft of the motor 100 (w3) and the default zero-point of the output shaft of the motor 100 (w1), and a second driving unit to drive the output shaft of the motor to return until the deviation ($\varepsilon$) is less than the default value.

Figure 3:
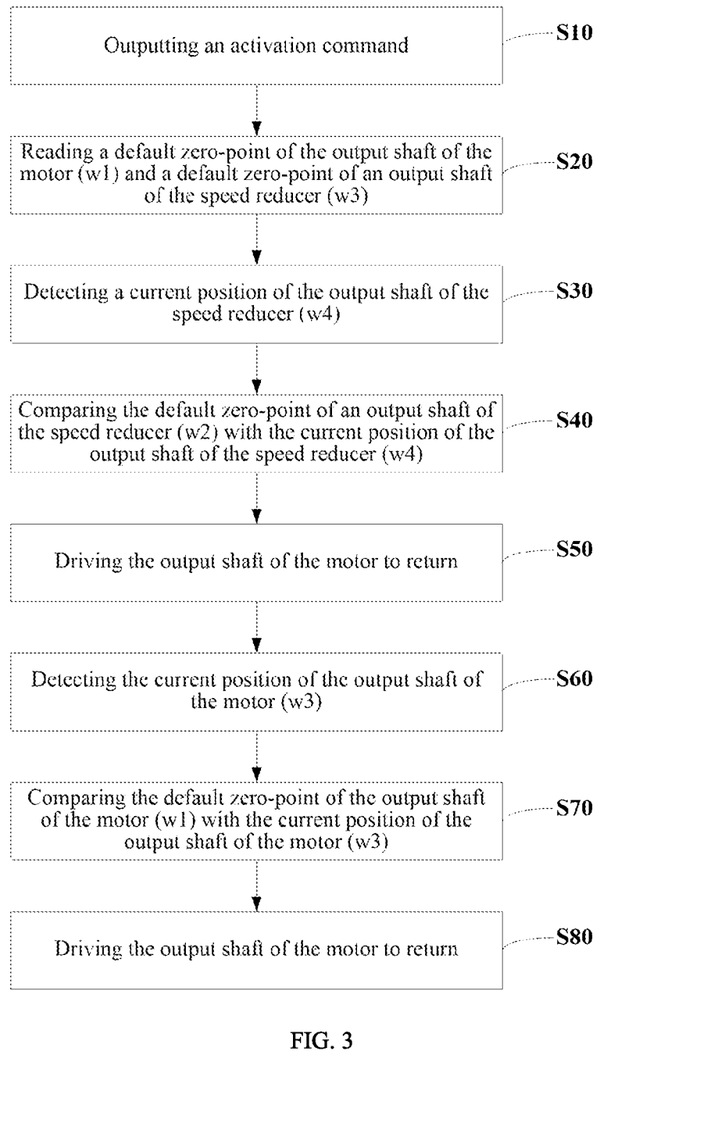
FIG. 3 is a flow chart illustrating the method for controlling zero-return of the servo of the robot in accordance with one embodiment of the present disclosure.

Referring to FIGS. 1-3, the method for controlling the zero-return of the servo includes:

In step S10 outputting an activation command to the motor 100, wherein the activation command includes a zero-return command.

The servo is a position (angle) servo driver that is suitable for control systems that require constant angle changes and can be maintained. Currently, it has been widely used in high-end remote control toys, such as airplanes, submarine models, and remote control robots. The first encoder 300 and the second encoder 400 are single-turn encoder.

Conventionally, in a stop state, the output shaft of the reducer of the servo is deflected due to gravity, thereby being out of the original position.

In an embodiment, a single-turn encoder is configured on an output end of the speed reducer 200 to realize unique position encoding, and thus the servo may achieve precise zero-return. For instance, a controller of the servo issues the activation command. In response to the activation command, the servo returns to a default position, i.e., zero-point. Thus, the activation command may include a zero-return command. Afterward, the servo continues to perform operations, such as moving to the left or moving to the right, according to the commands input from the users.

In step S20, reading a default zero-point of the output shaft of the motor 100 (w1) and a default zero-point of an output shaft of the speed reducer 200 (w2).

In an embodiment, when the motor 100 receives the activation command. In response to the activation command, the servo returns to the default zero-point. First, the default zero-point of the output shaft of the motor 100 (w1) and the default zero-point of an output shaft of the speed reducer 200 (w2) are stored in a storage. It can be understood that the zero-point(s) stored in the storage may be amended when the servo is in an off state. Also, the default zero-point of the output shaft of the motor 100 (w1) and the default zero-point of an output shaft of the speed reducer 200 (w2) are adopted as the reference points, and may be adopted to be compared with a current position of the output shaft of the motor 100 (w3) and a current position of the output shaft of the speed reducer 200 (w4).

In step S30, detecting a current position of the output shall of the speed reducer 200 (w4) by the second encoder 400.

In an embodiment, the second encoder 400 is configured on an output end of the speed reducer 200. The second encoder 400 couples with the output shaft of the speed reducer 200 to detect the current position of the output shaft of the speed reducer 200. In an example, the second encoder 400 may be, but not limited to, a single-turn encoder, i.e., a lower precision 12-bit resolution absolute encoder with a minimum resolution of 360 degrees/4096=0.087890625.

In step S40, comparing the default zero-point of an output shaft of the speed reducer 200 (w2) with the current position of the output shaft of the speed reducer 200 (w4).

In an example, the step S40 may be conducted by, not limited to, a comparison circuit. It can be understood that the default zero-point of an output shaft of the speed reducer 200 (w2) and the current position of the output shaft of the speed reducer 200 (w4) may be encoded to be analog signals or digital signals.

In step S50, driving the output shaft of the motor 100 to return until the default zero-point of the output shaft of the speed reducer 200 (w2) is the same with the current position of the output shaft of the speed reducer 200 (w4) upon determining the default zero-point of an output shaft of the speed reducer 200 (w2) is not the same with the current position of the output shaft of the speed reducer 200 (w4).

By driving the motor 100 to return, the output shaft of the speed reducer 200 is relatively driven to return. The comparing step in the step S50 ensures that the output shaft of the speed reducer 200 returns to the default zero-point of the output shaft of the motor 100 (w1), and the output shaft of the motor 100 is driven to return to the default zero-point of an output shaft of the speed reducer 200 (w2).

In step S60, detecting the current position of the output shaft of the motor 100 (w3) by the first encoder 300.

In an example, the first encoder 300 electrically connected to the output end of the motor to detect the current position of the output shaft of the motor 100. In an example, the first encoder 300 may be, but not limited to, a single-turn encoder, i.e., a lower precision 12-bit resolution absolute encoder with a minimum resolution of 360 degrees/4096.

In step S70, comparing the default zero-point of the output shaft of the motor 100 (w1) with the current position of the output shaft of the motor 100 (w3).

In an example, the step S70 may be conducted by the comparison circuit or a comparison process.

In step S80, driving the output shaft of the motor 100 to return until the default zero-point of the output shaft of the motor 100 (w1) is the same with the current position of the output shaft of the motor 100 (w3) upon determining the default zero-point of the output shaft of the motor 100 (w1) is not the same with the current position of the output shaft of the motor 100 (w3).

It can be understood that the step S80 is configured for the reason the reduction ratio N exists between the output shaft of the speed reducer 200 and the output shaft of the motor 100. In an example, if the single-turn encoder having 12-bit precision is adopted, there may be an angle error, i.e., 0.087890625*N, between the current position of the output shaft of the motor 100 (w3) and the default zero-point of the output shaft of the motor 100 (w1).

Figure 4:
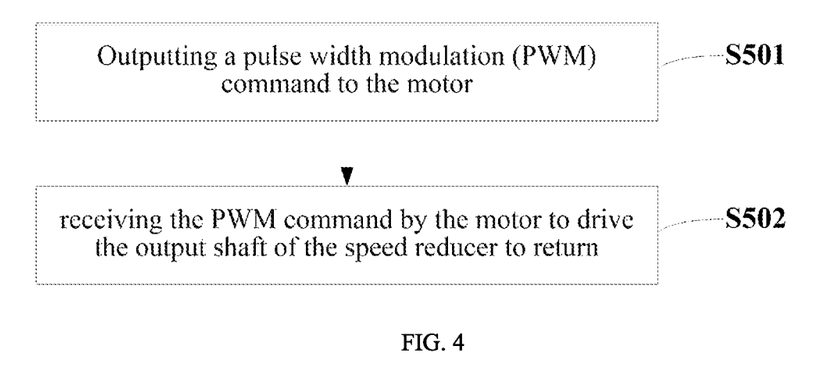
FIG. 4 is a flow chart illustrating the step S50 of the method in FIG. 3.

Referring to FIGS. 1 and 4, the step S50 may further include:

In step S501, outputting a pulse width modulation (PWM) command to the motor.

In the embodiment, the PWM command is a position command with a period of 1 ms. After being transmitted to the MCU, the operation is converted into a duty signal of the power switch tube. In an example, the PWM command is the high-low level signals with a frequency of 16K. The duty ratio signals output by the MCU determines the ratio of the high-duration and low-duration. Different control voltages can be formed, thereby driving the rotation speed of the motor 100 to change.

In step S502, receiving the PWM command by the motor to drive the output shaft of the speed reducer 200 to return until the default zero-point of an output shaft of the speed reducer 200 (w2) is the same with the current position of the output shaft of the speed reducer 200 (w4).

In the embodiment, the servo is a position servo driver, and the rotation range cannot exceed 180 degrees, which is suitable for those drivers that need to be constantly changed and can be maintained, such as the joints of the robot, the rudder surface of the aircraft, etc. The motor 100 rotates after receiving the PWM command, and drives the output shaft of the speed reducer 200 to rotate until w2 is equal to w4.

Figure 5:
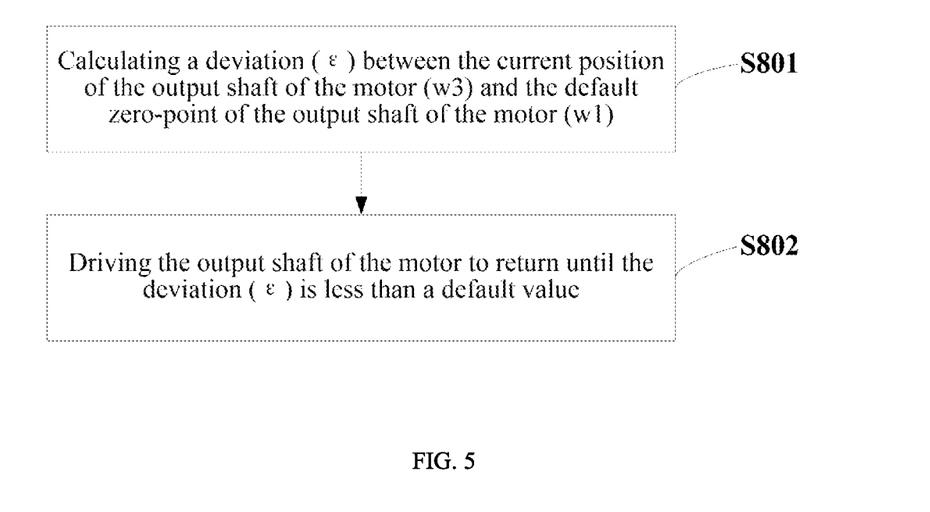
FIG. 5 is a flow chart illustrating the step S80 of the method in FIG. 3 or 4.

Referring to FIGS. 1 and 5, the step S80 may include:

In step S801, calculating a deviation (ε) between the current position of the output shaft of the motor 100 (w3) and the default zero-point of the output shaft of the motor 100 (w1).

In step S802, driving the output shaft of the motor 100 to return until the deviation (ε) is less than a default value.

In an example, the default value may range from 0.01° to 0.1°.

When the servo is started, the current position of the output shaft of the speed reducer 200 is first compared with the zero-point of the output shaft of the preset speed reducer 200, and the output shaft of the drive motor 100 is driven to drive the output shaft of the reducer 200. The output shaft of the reducer 200 reaches the zero-point to realize coarse adjustment, and then compares the current position of the output shaft of the motor 100 with the preset zero-point of the output shaft of the motor 100, and drives the output shaft of the motor 100 to rotate to the zero-point, thereby realizing Precise zero return of the servo.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

For the purpose of describing the technical solutions of the present disclosure, the following describes through specific embodiments.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for controlling zero-return of a servo of a robot, wherein the servo comprises a motor, a speed reducer electrically connected to an output shaft of the motor, a first encoder electrically connected to the output shaft of the motor, a second encoder electrically connected to an output shaft of the speed reducer, and a motor controller electrically connected to the motor, the first encoder and the second encoder, the method comprising executing on the motor controller steps of:

outputting an activation command to the motor, wherein the activation command comprises a zero-return command;

reading a default zero-point of the output shaft of the motor (w1) and a default zero-point of the output shaft of the speed reducer (w2);

a first detecting step comprising detecting a current position of the output shaft of the speed reducer (w4) by the second encoder;

a first comparing step comprising comparing the default zero-point of the output shaft of the speed reducer (w2) with the current position of the output shaft of the speed reducer (w4);

a first driving step comprising driving the output shaft of the motor (w1) to return until the default zero-point of the output shaft of the speed reducer (w2) is the same with the current position of the output shaft of the speed reducer (w4) in response to the default zero-point of the output shaft of the speed reducer (w2) being not the same with the current position of the output shaft of the speed reducer (w4);

a second detecting step comprising detecting a current position of the output shaft of the motor (w3) by the first encoder;

a second comparing step comprising comparing the default zero-point of the output shaft of the motor (w1) with the current position of the output shaft of the motor (w3); and a second driving step comprising driving the output shaft of the motor to return until the default zero-point of the output shaft of the motor (w1) is the same with the current position of the output shaft of the motor (w3) in response to the default zero-point of the output shaft of the motor (w1) being not the same with the current position of the output shaft of the motor (w3).

2. The method as claimed in claim 1, wherein the first driving step further comprises:

outputting a pulse width modulation (PWM) command to the motor; and receiving the PWM command by the motor to drive the output shaft of the speed reducer to return until the default zero-point of the output shaft of the speed reducer (w2) is the same with the current position of the output shaft of the speed reducer (w4).

3. The method as claimed in claim 2, wherein the second driving step further comprises:

calculating a deviation (ε) between the current position of the output shaft of the motor (w3) and the default zero-point of the output shaft of the motor (w1); and driving the output shaft of the motor to return until the deviation (ε) is less than a default value.

4. The method as claimed in claim 3, wherein the default value ranges from 0.01 to 0.1 degree.

5. The method as claimed in claim 1, wherein the first encoder is a single-turn encoder.

6. The method as claimed in claim 1, wherein the second encoder is a single-turn encoder.

7. A servo with enhanced zero-return, comprising:
a motor;
a speed reducer electrically connected to an output shaft of the motor;
a first encoder electrically connected to the output shaft of the motor;
a second encoder electrically connected to the output shaft of the speed reducer;
a motor controller electrically connected to the motor, the first encoder, and the second encoder, the motor controller comprising one or more processor and a storage; and
one or more computerized instructions stored in the storage and configured to executed to execute a method, the method comprising:
outputting an activation command to the motor, wherein the activation command comprises a zero-return command;

reading a default zero-point of the output shaft of the motor (w1) and a default zero-point of the output shaft of the speed reducer (w2);

a first detecting step comprising detecting a current position of the output shaft of the speed reducer (w4) by the second encoder;

a first comparing step comprising comparing the default zero-point of the output shaft of the speed reducer (w2) with the current position of the output shaft of the speed reducer (w4);

a first driving step comprising driving the output shaft of the motor (w1) to return until the default zero-point of the output shaft of the speed reducer (w2) is the same with the current position of the output shaft of the speed reducer (w4) in response to the default zero-point of the output shaft of the speed reducer (w2) being not the same with the current position of the output shaft of the speed reducer (w4);

a second detecting step comprising detecting a current position of the output shaft of the motor (w3) by the first encoder;

a second comparing step comprising comparing the default zero-point of the output shaft of the motor (w1) with the current position of the output shaft of the motor (w3); and a second driving step comprising driving the output shaft of the motor to return until the default zero-point of the output shaft of the motor (w1) is the same with the current position of the output shaft of the motor (w3) in response to the default zero-point of the output shaft of the motor (w1) being not the same with the current position of the output shaft of the motor (w3).

8. The servo as claimed in claim 7, wherein the first driving step further comprises:

outputting a pulse width modulation (PWM) command to the motor; and receiving the PWM command by the motor to drive the output shaft of the speed reducer to return until the default zero-point of the output shaft of the speed reducer (w2) is the same with the current position of the output shaft of the speed reducer (w4).

9. The servo as claimed in claim 8, the second driving step further comprises:

calculating a deviation (ε) between the current position of the output shaft of the motor (w3) and the default zero-point of the output shaft of the motor (w1); and driving the output shaft of the motor to return until the deviation (ε) is less than a default value.

10. The servo as claimed in claim 9, wherein the default value ranges from 0.01 to 0.1 degree.

11. The servo as claimed in claim 7, wherein the first encoder is a single-turn encoder.

12. The servo as claimed in claim 7, wherein the second encoder is a single-turn encoder.

13. A robot with enhanced zero-return, comprising a servo, wherein the servo comprises:
a motor;
a speed reducer electrically connected to an output shaft of the motor;
a first encoder electrically connected to the output shaft of the motor;
a second encoder electrically connected to the output shaft of the speed reducer;
a motor controller electrically connected to the motor, the first encoder, and the second encoder, the motor controller comprising one or more processors and a storage; and one or more computer programs stored in the storage and configured to executed by the one or more processors, the one or more computer programs controlling the servo to:

output an activation command to the motor, wherein the activation command comprises a zero-return command;

read a default zero-point of the output shaft of the motor (w1) and a default zero-point of the output shaft of the speed reducer (w2);

detect a current position of the output shaft of the speed reducer (w4) by the second encoder;

compare the default zero-point of the output shaft of the speed reducer (w2) with the current position of the output shaft of the speed reducer (w4);

drive the output shaft of the motor (w1) to return until the default zero-point of the output shaft of the speed reducer (w2) is the same with the current position of the output shaft of the speed reducer (w4) in response to the default zero-point of the output shaft of the speed reducer (w2) being not the same with the current position of the output shaft of the speed reducer (w4);

detect a current position of the output shaft of the motor (w3) by the first encoder;

compare the default zero-point of the output shaft of the motor (w1) with the current position of the output shaft of the motor (w3); and drive the output shaft of the motor to return until the default zero-point of the output shaft of the motor (w1) is the same with the current position of the output shaft of the motor (w3) in response to the default zero-point of the output shaft of the motor (w1) being not the same with the current position of the output shaft of the motor (w3).

14. The robot as claimed in claim 13, wherein the one or more computer programs controlling the servo to:

output a pulse width modulation (PWM) command to the motor; and receive the PWM command by the motor to drive the output shaft of the speed reducer to return until the default zero-point of the output shaft of the speed reducer (w2) is the same with the current position of the output shaft of the speed reducer (w4).

15. The robot as claimed in claim 14, wherein the one or more computer programs controlling the servo to:

calculate a deviation ($\varepsilon$) between the current position of the output shaft of the motor (w3) and the default zero-point of the output shaft of the motor (w1); and drive the output shaft of the motor to return until the deviation ($\varepsilon$) is less than a default value.

16. The robot as claimed in claim 15, wherein the default value ranges from 0.01 to 0.1 degree.

17. The robot as claimed in claim 13, wherein the first encoder is a single-turn encoder.

18. The robot as claimed in claim 13, wherein the second encoder is a single-turn encoder.

* * * * *